Figure 3:
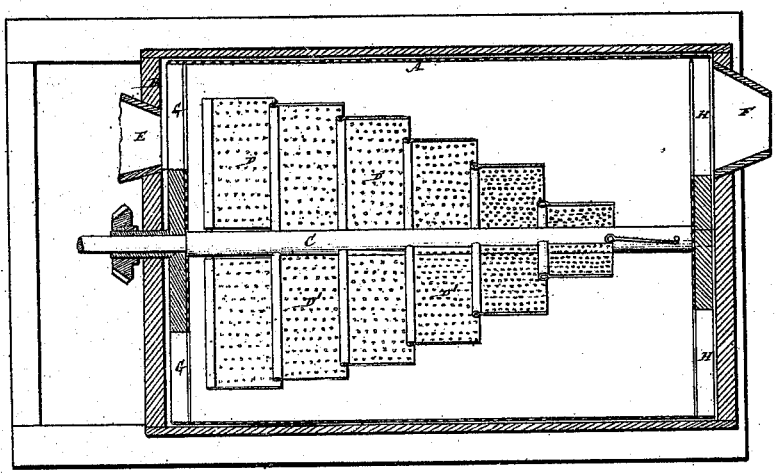

Averell & Malan,
Vegetable Peeler.
No. 100,583. Patented Mar. 8, 1870.
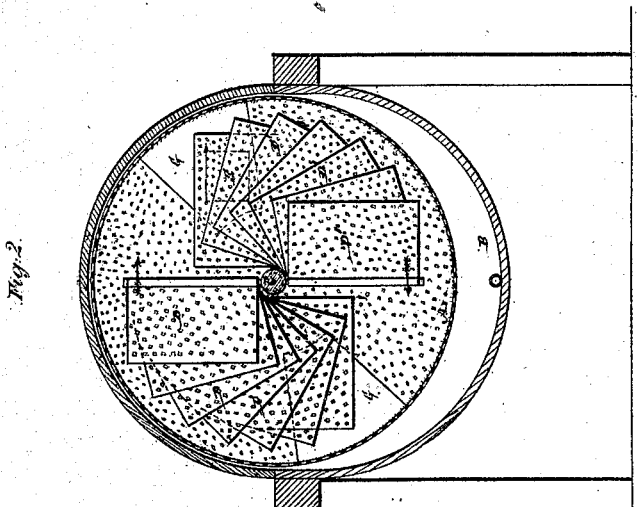
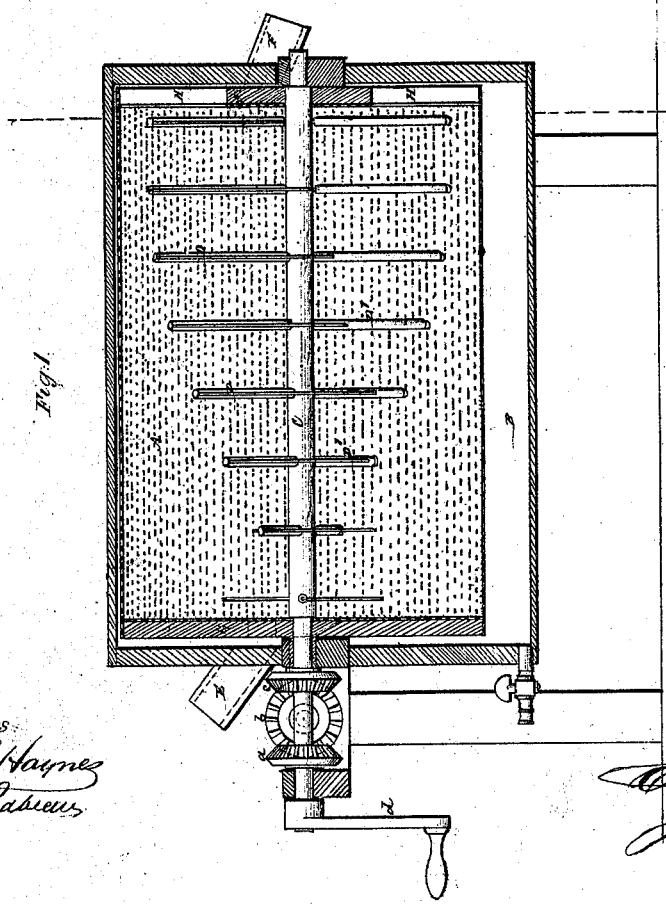

Averell & Malan,
Vegetable Peeler.
No. 100,583. Patented Mar. 8, 1870.

Witnesses:
Fred Haynes
R. F. Rabeau

E. H. Averell
J. Malan

United States Patent Office.

ELLICOTT D. AVERELL AND JOSEPH MALAN, OF BROOKLYN, NEW YORK.

Letters Patent No. 100,583, dated March 8, 1870.

---

IMPROVED VEGETABLE AND FRUIT-PEELER.

---

The Schedule referred to in these Letters Patent and making part of the same

---

*To all whom it may concern:*

Be it known that we, ELLICOTT D. AVERELL and JOSEPH MALAN, both of Brooklyn, in the county of Kings, and State of New York, have invented a new and useful Vegetable and Fruit-Peeler, of which the following is a full, clear, and exact description, reference being had to accompanying drawing forming part of this specification, and in which—

Figures 1 and 2 represent sectional elevations at right angles to each other of a vegetable and fruit-peeler constructed in accordance with our improvement, fig. 2 being a sectional view through the line $x\,x$ in fig. 1; and Figure 3, a sectional plan of the machine in part.

Similar letters of reference indicate corresponding parts.

Our invention embraces a combination of a revolving series of spirally-disposed hinged vanes, preferably of perforated or grater-like construction, with an external grater-like cylinder arranged to rotate in a reverse direction to the vanes, and operating in concert with suitable inlets and outlets in the ends of the cylinder and of an outer or surrounding case thereto, whereby the vegetables or fruit, being fed in at the one end of the cylinder, are peeled by the action of the grater-like surfaces during the rotation of the cylinder and vanes in a given direction, and are delivered at the opposite end of the cylinder by the rotation of said devices in a reverse direction.

Although applicable to peeling various kinds of vegetables and fruits, it will be sufficient here to associate the invention with the peeling of potatoes or peaches.

In the accompanying drawing—

A represents a revolving horizontal cylinder, of perforated and grater-like construction on its periphery, the same being arranged to revolve within a tube or case, B, partially filled with water.

C is a shaft arranged to run concentrically through the cylinder A, and armed with one, two or more rows of vanes D D', hinged or pivoted to swing on radial rods secured to said shaft, and arranged spirally thereon, so that each row of vanes D or D' is spirally disposed around said shaft.

The shaft B is revolved in a reverse direction to the cylinder A, which reverse movements may be effected by bevel-gears $a$, $b$, and $c$, or by any other suitable means.

The driving-power may be applied to the shaft B by a crank, $d$, or otherwise.

Arranged in the ends of the case B, to one side of the center of the revolving cylinder, are an inlet-hopper or opening, E, and outlet-spout or delivery-aperture, F, and the ends of the cylinder A are also provided with correspondingly-disposed inlet and outlet-openings G and H, in number corresponding to the number of rows of vanes, at the respective ends of which they are arranged, and so that in the rotation of said cylinder they sweep across the inlet and outlet-openings E and F.

It is desirable that the openings G and H should be of somewhat larger area than the openings E and F, to give time for free passage of the vegetables or fruit into and out of the cylinder.

These vanes D D' in each row are of suitable size to nearly extend across the cylinder, and are disposed in such proximity to each other that when the shaft C is rotated with the front edges of the vanes in advance, they are thrown or fall down, the one upon the other, by which means, and in consequence of their spiral disposition on the shaft, they form worm-like longitudinal partitions for the peeled vegetables or fruit to slide or roll down to the delivery-outlets H and F, as the former of such outlets is brought in line with the latter one.

In the reverse rotation of the shaft C, however, and reverse rotation of the cylinder, then the vanes D D', moving with their back edges in advance, are thrown out to travel in planes which transversely intersect the cylinder. This latter is the position they occupy when the work of peeling is being carried on, and which is effected by the action of the grater-like cylinder in combination with the vanes, the latter serving to break up and rotate the vegetables or fruit, and, in conjunction with the cylinder, to insure the presentation of its whole outside surface or skin to the grating-surfaces.

To further assist such operation of grating, it is preferred to make the vanes D D' also of grater-like construction.

In working the machine, all that is necessary is to see that the case B is properly charged with water, and as motion is given to the cylinder A and vanes D D', so that the latter travel as indicated by arrow in fig. 2, to feed in the vegetables or fruit through the hopper E and inlet-opening G, when the grating and rubbing and washing which take place will most effectually and rapidly-peel the fruit or vegetables, free from that waste which attaches to using a knife.

The dirt and peelings pass off into the bottom of the case B, which may occasionally be drawn off and fresh water introduced.

When it is required to discharge the peeled articles, which may be at intervals during the operation, then the cylinder A and vanes D D' are rotated in a reverse direction to form worm-like delivery partitions of the vanes to the outlets H and F, as hereinbefore described, and as represented in fig. 3 of the drawing.

What is here claimed, and desired to be secured by Letters Patent, is—

1. The combination of the hinged or pivoted vanes

D D', arranged spirally on or around the revolving shaft C, in combination with the grater-like cylinder A, made to revolve in a reverse direction to said shaft, substantially as specified.

2. The hinged or pivoted vanes D D', constructed to form graters, in combination with the grater-like cylinder A, essentially as described.

3. The arrangement of the hopper or inlet-opening E and outlet-opening F in the ends of the case B with the inlets and outlets G and H in the ends of the cylinder A, for operation in connection with the hinged or pivoted vanes D D' and said cylinder A, substantially as specified.

E. D. AVERELL.
JOSEPH MALAN.

Witnesses:
  FRED. HAYNES,
  M. J. SHANLEY.